April 25, 1933. P. HUDSON 1,905,874
SELF HOLDING AUTO LICENSE FRAME
Filed Jan. 19, 1932
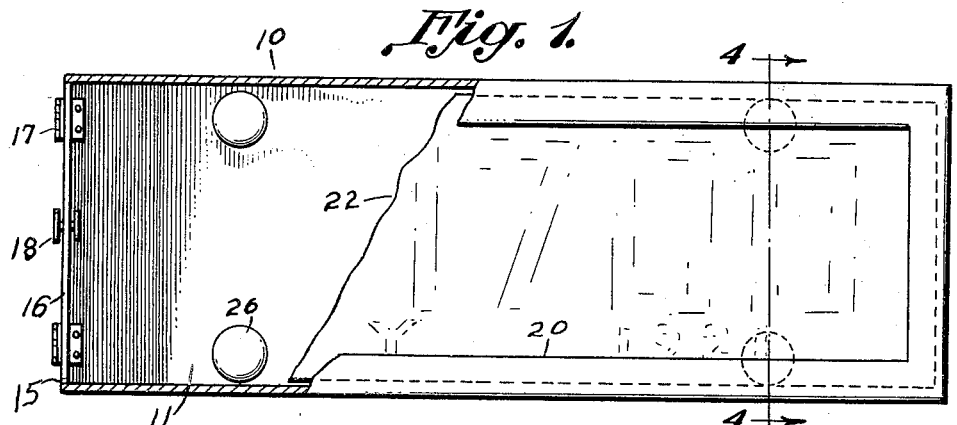
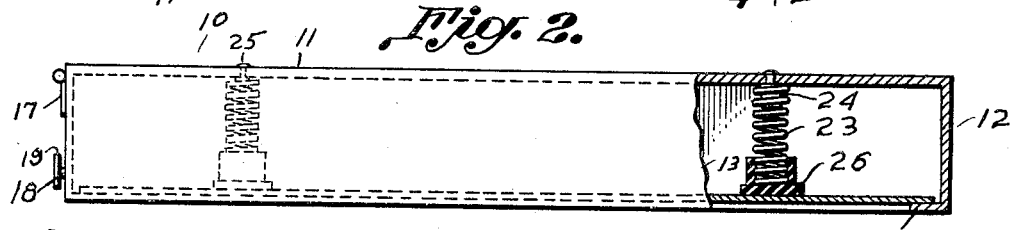
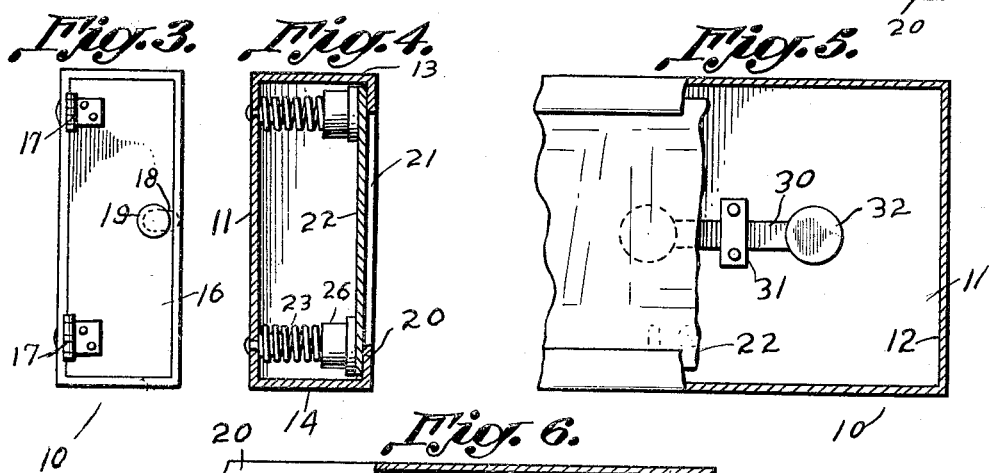
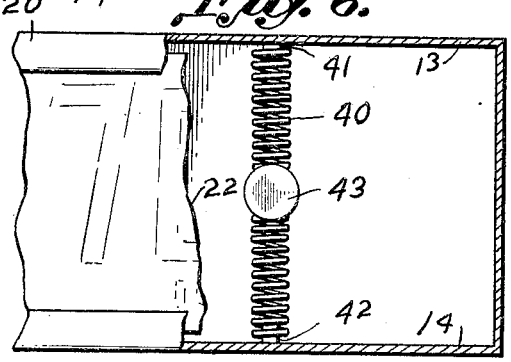
Inventor:
Patrick Hudson
By Miller + Miller
Attorneys Patented Apr. 25, 1933

1,905,874

UNITED STATES PATENT OFFICE

PATRICK HUDSON, OF NEW YORK, N. Y.

SELF-HOLDING AUTO LICENSE FRAME

Application filed January 19, 1932. Serial No. 587,576.

This invention relates to a self-holding auto license frame and has for an object to provide an improved license holder for automobiles, trucks or other vehicles, wherein the law requires identification tags, or license plates.

A further object of this invention is to provide an improved license plate frame or holder, which frame or holder is to be permanently attached to the automobile or vehicle, being either added to the vehicle by the vehicle owner or supplied additionally by the automobile manufacturer.

A further object of this invention is to provide a license plate holder wherein it is unnecessary to use any bolts or nuts or other temporary attaching means, and wherein it is only necessary to insert the license plate into the frame to have it firmly and securely held in position therein, and at the same time wherein it will not be liable to rattle or to become lost in use.

Still a further object of this invention is to provide a license plate holder wherein the license plate may be easily inserted without tools and when in position will present a neat appearance.

With the foregoing and other objects in view, as will hereinafter become apparent, this invention comprises the constructions, combinations and arrangements of parts, hereinafter set forth, disclosed and shown on the accompanying drawing. In this drawing, Figure 1 is an elevational view of the license plate holder partly in section and partly broken away.

Figure 2 is a top plan view of Figure 1.

Figure 3 is a view looking from the left end of Figures 1 and 2.

Figure 4 is a sectional view on line 4—4 of Figure 1.

Figure 5 is a partly sectional and partly elevational view of a slightly modified form, and Figure 6 is a similar view of another modification.

There is shown at 10 the holder which it will be observed is in the form of a box having a back 11, a closed end 12, similar closed top 13 and bottom 14, an open end 15, the open end 15 having a door 16 hinged thereto at 17 and provided with a latch 18, which also serves as a knob 19 for opening the door.

A front wall 20 is formed in the box like holder 10, this wall 20, however, having an opening 21 therein, the opening 21 being slightly smaller than the size of the license plate 22 that is to be placed therein. A plurality of spring members 23 are provided in the holder 10, one end of the spring member 23 being held in position by protuberances 24, which may be riveted to the back 11 as at 25. Rubber fingers or tips 26 are provided enclosing the ends of the springs and when the license plate is not in position the tips 26 press against the inside of the wall or frame 20.

In operation, the knob 19 is turned to unlatch the door 16, whereupon it is opened and the license plate 22 is inserted between the rubber tips 26 of the springs 23 and the frame or wall 20. It is only necessary to slide the plate within the holder 10 to force it past the springs, whereupon the springs will compress efficiently allowing it to pass by into the position shown in Figures 1 and 2. The springs are fairly strong and in combination with the rubber tips 26 will serve to hold the license plate 22 securely in position without allowing any possibility of either rattling or being lost.

Although four springs 23 are shown in this form, it is obvious that a greater or lesser number of springs may be provided as desired. In the modification shown in Figure 5, a different form of spring is provided, being in the form of a bent substantially V-shaped leaf spring 30, which may be held to the back 11 by means of a bridge 31. The two ends of the V-shaped leaf spring 30 are each provided with a rubber finger or tip 32 which will press against the back of the license plate 22 to hold it in position when it has been properly inserted.

In Figure 6 still another form of spring holding member is provided, being in the form of a spring 40 held between protuberances 41 and 42 on the top wall 13 and bottom wall 14 of the holder 10. A rubber tip 43 is likewise provided with this form of spring, this rubber tip, however, being secured centrally of the spring 40 as by a sleeve projecting from the back of the finger 43 passing about the spring 40 so that the finger 43 holds the license plate 22 in position.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. A license plate holder comprising a box, the front of said box being recessed to form a frame, a closure member in one edge of said box to admit of a license plate being inserted therethrough, spring means secured in said box, said spring means cooperating to hold the license plate against said frame, said spring means comprising a plurality of compression springs, one end of said spring being secured against the back of said box member and a rubber finger secured about the other end of said spring, said rubber finger being adapted to be pressed against the back of said license plate by said spring and hold said license plate against said frame.

2. A license plate holder comprising a box, the front of said box being recessed to form a frame, a closure member in one edge of said box to admit of a license plate being inserted therethrough, spring means secured in said box, said spring means cooperating to hold the license plate against said frame, said spring means comprising a spring secured to opposite sides of said box, and a rubber tip secured centrally of said spring, said spring pressing said tip against the back of said license plate against the frame.

3. A license plate holder comprising a box like member adapted to receive a license plate therein, one wall of said box like member being recessed to allow said license plate to be visible therethrough, and means for holding said license plate firmly against said frame, said means comprising a plurality of spring assemblies, each spring assembly comprising a coil spring, one end of which is secured against a wall of said box like member, a rubber tip placed on the other end of said coil spring, said rubber tip enclosing said end of said coil spring and resting against the back of said license plate.

4. A license plate holder comprising a box, the front of said box being recessed to form a frame, a hinged closure member in one edge of said box to admit of a license plate being inserted therethrough, spring means secured in said box, said spring means cooperating to hold the license plate against said frame, said spring means comprising a plurality of coil springs, said coil springs being secured within said box member, and rubber fingers secured to said coil spring, said rubber fingers being adapted to be pressed against the back of the license plate by said coil springs and hold said license plate against said frame.

In testimony whereof I affix my signature.

PATRICK HUDSON.